Oct. 3, 1939.    L. E. HELSEL    2,174,657
FISH ELEVATOR
Filed Oct. 6, 1938
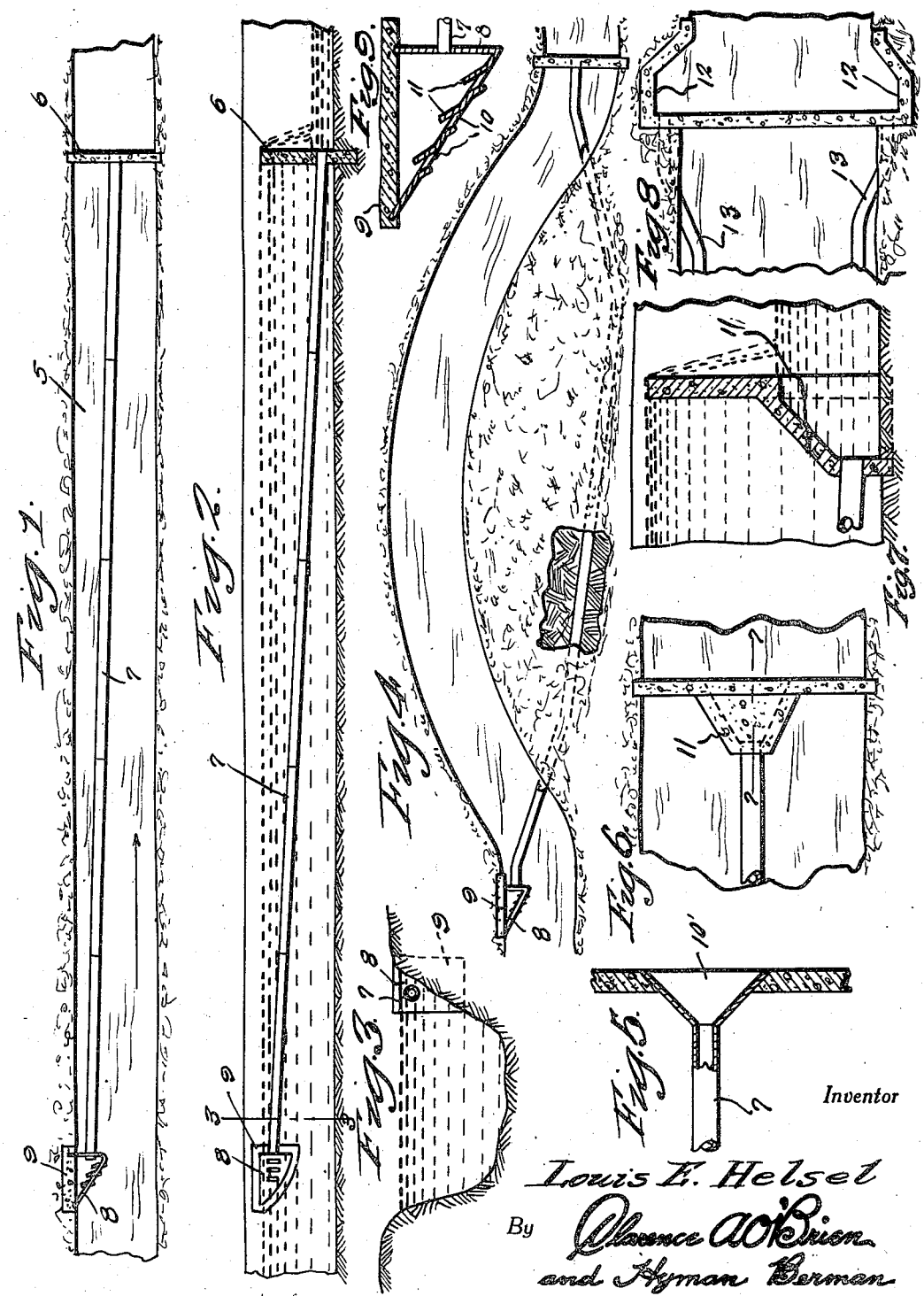
Inventor
Louis E. Helsel
By Clarence A. O'Brien
and Hyman Berman
Attorneys Patented Oct. 3, 1939

2,174,657

UNITED STATES PATENT OFFICE 2,174,657

FISH ELEVATOR

Louis E. Helsel, Duncansville, Pa.

Application October 6, 1938, Serial No. 233,681

3 Claims. (Cl. 61—21)

This invention relates to fish elevators and has for the primary object the provision of a device of this character which will be simple in construction and easy to install in a body of water having located therein dams and other obstructions tending to prevent the passing of fish, the present invention presenting an unobstructed water passage for the fish to swim through in order to arrive at a place beyond the dam or obstruction.

With these and other objects in view, the invention consists in certain novel features of construction, combination and arrangement of parts to be hereinafter more fully described and claimed.

For a complete understanding of my invention, reference is to be had to the following description and accompanying drawing, in which Figure 1 is a top plan view illustrating a fish elevator located in a stream or like body of water and constructed in accordance with my invention.

Figure 2 is a vertical sectional view illustrating the same.

Figure 3 is a transverse sectional view taken on line 3—3 of Figure 2.

Figure 4 is a top plan view showing a modification of the present invention.

Figure 5 is a fragmentary sectional view showing the entrance of the water passage in one form of the present invention.

Figure 6 is a fragmentary plan view showing another modification of the present invention.

Figure 7 is a sectional view taken on line 7—7 of Figure 6.

Figure 8 is a fragmentary plan view showing another modification of the present invention.

Figure 9 is a longitudinal sectional view illustrating an escape chamber for the fish after passing through the water passage.

Referring in detail to the drawing, the numeral 5 indicates a body of water which in this instance is in the form of a stream having a dam 6 which provides an obstruction to the fish desiring to swim upstream past the dam. The flow of the water is in the direction indicated by the arrow in Figure 1. To render the passing of the fish of the dam 6 comparatively easy, the present invention is installed in the stream and consists of a comparatively long conduit 7 which has one end mounted in an opening provided in the dam 6 below the level of the water below the dam. The conduit 7 gradually slopes upwardly from the dam and is connected with a chamber 8 mounted on a suitable abutment 9 located in the bank of the stream. The slope of the conduit 7 is very gradual so that the flow of the water therethrough will not be rapid. The chamber 8 has a plurality of slots 10 and also is provided with louvers 11 arranged inwardly and outwardly of the casing adjacent the slots to prevent trash and other foreign matter from clogging the slots.

Fish desiring to pass the dam from a point below stream of the dam enter the conduit 7 and swim into the chamber 8 and escape therefrom by way of the slots 10. Thus it will be seen that the present invention provides a comparatively normal water passage for the fish to swim through in order to pass the dam.

In many instances the stream may have curves therein above the dam, as shown in Figure 4, and in order to obviate the necessity of curving the conduit 7 in order to follow the stream, the conduit may be passed under the ground laterally of the stream and again connected with the stream at a point above the curve, as clearly shown in Figure 4.

It may be preferable to have the fish receiving end of the conduit flared, as shown at 10', with the flared end mounted in the dam giving a comparatively large entrance for the fish to enter the conduit. Again it may be desirable to have the entrance 10' constructed of the same material as the dam and further it may be desirable to have the dam and entrance in the form of a chamber 11' which will allow water to back into the chamber after passing over the dam, as clearly shown in Figure 7. The water backing up in the chamber becomes substantially still so as not to interfere with the fish desiring to enter the conduit.

Instead of having the chamber 11' arranged intermediate the ends of the dam, as shown in Figures 6 and 7, the dam may be constructed with laterally arranged chambers or pockets 12. The pockets 12 are located out of the normal flow of water so that the water within said pockets will become substantially idle and with conduits 13 connected thereto the fish may readily enter the conduits from the pockets and pass upstream. As shown in Figure 8 the conduits where connecting with the pockets 12 are arranged in the banks of the stream and are then brought into the stream at a point above the dam. Further, this illustration discloses the fact that several conduits may be employed when desired.

It is believed that the foregoing description, when taken in connection with the drawing will fully set forth the construction and advantages of this invention to those skilled in the art to which such a device relates, so that further detailed description will not be required.

What is claimed is:

1. A fish elevator comprising a conduit having one end mounted in a dam and open to water below the dam, a chamber connected with the other end of the conduit and located in the body of water upstream from the dam and provided with slots through which fish may escape, and louvers arranged on the chamber inwardly and outwardly thereof and adjacent the slots.

2. In a device of the character set forth a dam having formed therein a pocket to permit water to enter therein downstream of the dam, a conduit connected to said pocket and extending upstream from the dam at a gradual inclination, and a chamber having slots connected to the conduit to permit fish to escape therefrom and water to enter the conduit for passage therefrom below the dam, and means for anchoring the chamber in a bank of the stream.

3. A fish elevator comprising a conduit having one end mounted in a dam and open to water below said dam, and a chamber connected to the other end of the conduit and located in the body of water upstream from the dam and having a wall thereof disposed at an angle to the latter-named end of the conduit, said wall having struck therefrom portions to provide slots and louvers extending angularly to the slots.

LOUIS E. HELSEL.